(12) United States Patent
Totsuka

(10) Patent No.: US 10,999,461 B1
(45) Date of Patent: May 4, 2021

(54) IMAGE READING APPARATUS

(71) Applicant: CANON KABUSHIKI KAISHA, Tokyo (JP)

(72) Inventor: Satoshi Totsuka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/071,723

(22) Filed: Oct. 15, 2020

(30) Foreign Application Priority Data

Nov. 28, 2019 (JP) .............................. JP2019-215854

(51) Int. Cl.
*H04N 1/60* (2006.01)
*H04N 1/00* (2006.01)

(52) U.S. Cl.
CPC ..... *H04N 1/00814* (2013.01); *H04N 1/00803* (2013.01); *H04N 1/00806* (2013.01); *H04N 1/00819* (2013.01); *H04N 1/00997* (2013.01)

(58) Field of Classification Search
CPC ........... H04N 1/00814; H04N 1/00803; H04N 1/00806; H04N 1/00819; H04N 1/00997
See application file for complete search history.

(56) References Cited

U.S. PATENT DOCUMENTS

| 6,657,748 | B1 * | 12/2003 | Okita ..................... | H04N 1/401 |
| | | | | 358/461 |
| 2003/0142367 | A1 * | 7/2003 | Ito .......................... | H04N 1/486 |
| | | | | 358/461 |
| 2008/0278774 | A1 | 11/2008 | Enami et al. ............ | H04N 1/04 |
| 2010/0302605 | A1 * | 12/2010 | Suzuki ............... | H04N 1/00002 |
| | | | | 358/474 |
| 2013/0083352 | A1 * | 4/2013 | Kato .................. | H04N 1/00997 |
| | | | | 358/1.15 |
| 2013/0208323 | A1 * | 8/2013 | Washizawa .............. | H04N 1/12 |
| | | | | 358/406 |
| 2018/0332183 | A1 * | 11/2018 | Seki ................... | H04N 1/00835 |

* cited by examiner

*Primary Examiner* — Moustapha Diaby
(74) *Attorney, Agent, or Firm* — Venable LLP

(57) ABSTRACT

An image reading apparatus includes an original stacking portion, an original feeding portion, an image reading portion, a shading operation portion, and a receiving portion. The shading operation portion acquires a shading correction value by causing the image reading portion to read a white reference member with a predetermined reading resolution when an original is stacked on the original stacking portion. When a resolution change instruction is received before reading of the original is started, depending on the resolution change instruction, the shading operation portion acquires a shading correction value by causing again the image reading portion to read the white reference member with a changed reading resolution.

7 Claims, 12 Drawing Sheets

(a)

(b)

(a)

(b)

though of US 10,999,461 B1

IMAGE READING APPARATUS

FIELD OF THE INVENTION AND RELATED ART

The present invention relates to an image reading apparatus for reading an image of an original.

Conventionally, the image reading apparatus for reading the image of the original, mounted on a scanner, a copying machine or the like includes an automatic document feeder (ADF) and is capable of reading the image of the original, fed from an original tray of the ADF, with a set reading resolution (600 dpi or 300 dpi or the like). Such an image reading apparatus is capable of changing the reading resolution to 600 dpi or 300 cpi on the basis of reading job setting such as variable magnification or output resolution.

Incidentally, the image reading apparatus performs an operation of reading a white reference plate as reference data as preparation before the image of the original is read and then executes a correction value acquiring process for acquiring a shading correction value in general. In recent years, it is desired to shorten a time from a reading start instruction of an original until a first original is discharged. Therefore, in an image reading apparatus disclosed in U.S. Patent Application Publication No. US2008/0278774, the correction value acquiring process for acquiring the shading correction value is carried out in advance of a start of a reading job.

However, in a constitution disclosed in US2008/0278774, in the case where the correction value acquiring process for acquiring the shading correction value is carried out in advance of the start of the reading job, the correction value acquiring process has been carried out while fixing the reading resolution at 600 dpi, for example. On the other hand, in the case where shading of the magnification was changed to 50% in a copying process or in the case where transmission resolution of facsimile transmission is set at 300 dpi, an image reading process is performed with a reading resolution of 300 dpi. For this reason, the reading resolution when the correction value acquiring process is performed before the reading job and an actual reading resolution after the start of the reading job are different from each other in some cases.

SUMMARY OF THE INVENTION

According to an aspect of the present invention, there is provided an image reading apparatus comprising: an original stacking portion configured to stack an original; an original feeding portion configured to feed the original stacked on the original stacking portion; an image reading portion configured to read, with a set reading resolution, an image of the original fed by the original feeding portion and configured to generate image data in accordance with the read image; a shading operation portion configured to cause the image reading portion to read a white reference member so as to acquire a shading correction value for subjecting the image data to shading correction; and a receiving portion configured to receive a resolution change instruction for changing setting of the reading resolution, wherein the shading operation portion acquires the shading correction value by causing the image reading portion to read the white reference member with a predetermined reading resolution when the original is stacked on the original stacking portion, and when the resolution change instruction is received before reading of the original is started, depending on the resolution change instruction, the shading operation portion acquires the shading correction value by causing again the image reading portion to read the white reference member with a changed reading resolution.

Further features of the present invention will become apparent from the following description of exemplary embodiments with reference to the attached drawings.

Figure 4:
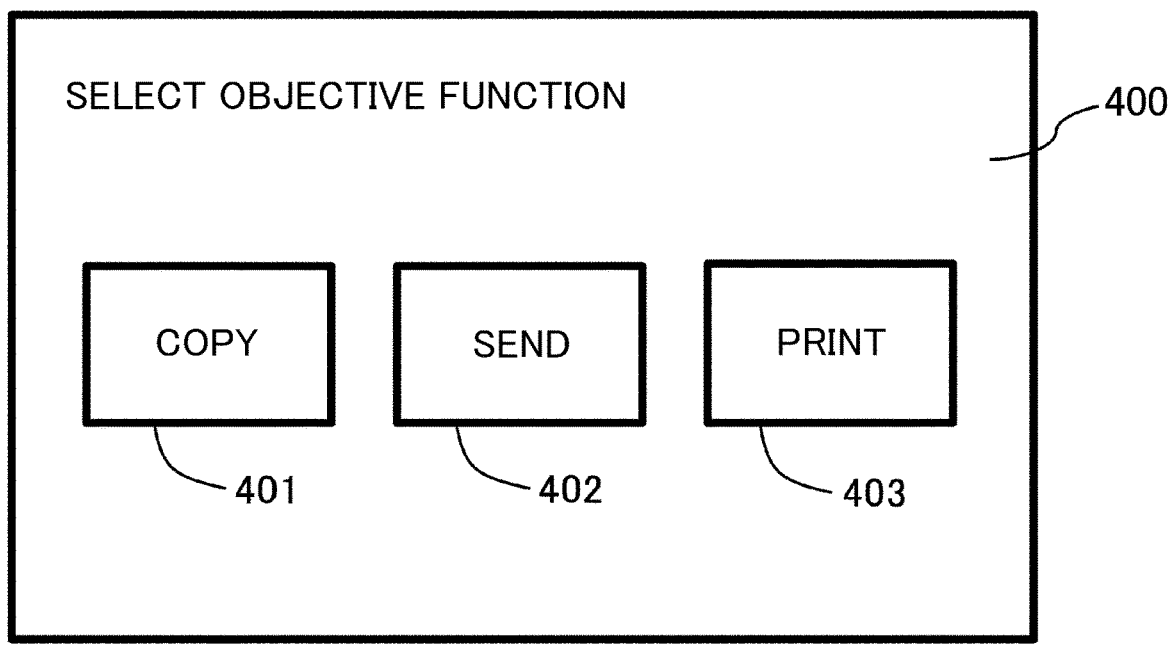
Figure 4:
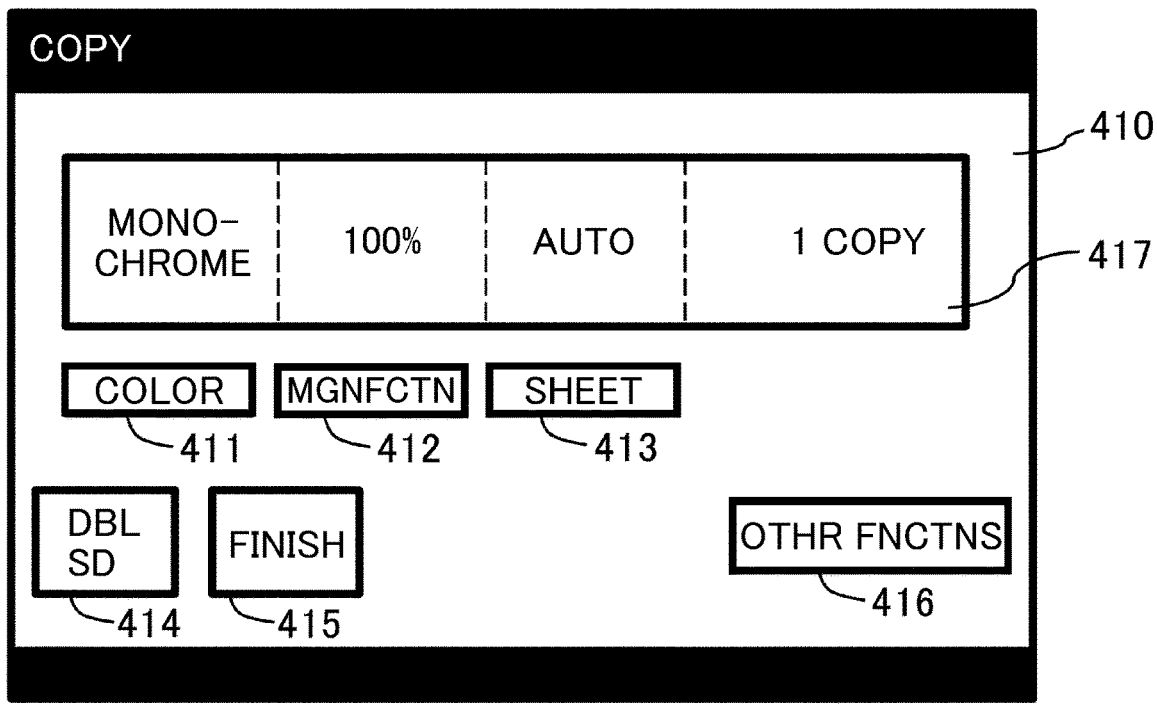

Parts (a) and (b) of FIG. 4 are schematic views each showing a display screen of an operating portion of the image reading apparatus of this embodiment, in which part (a) shows a top menu screen, and part (b) shows a copying screen.

Figure 5:
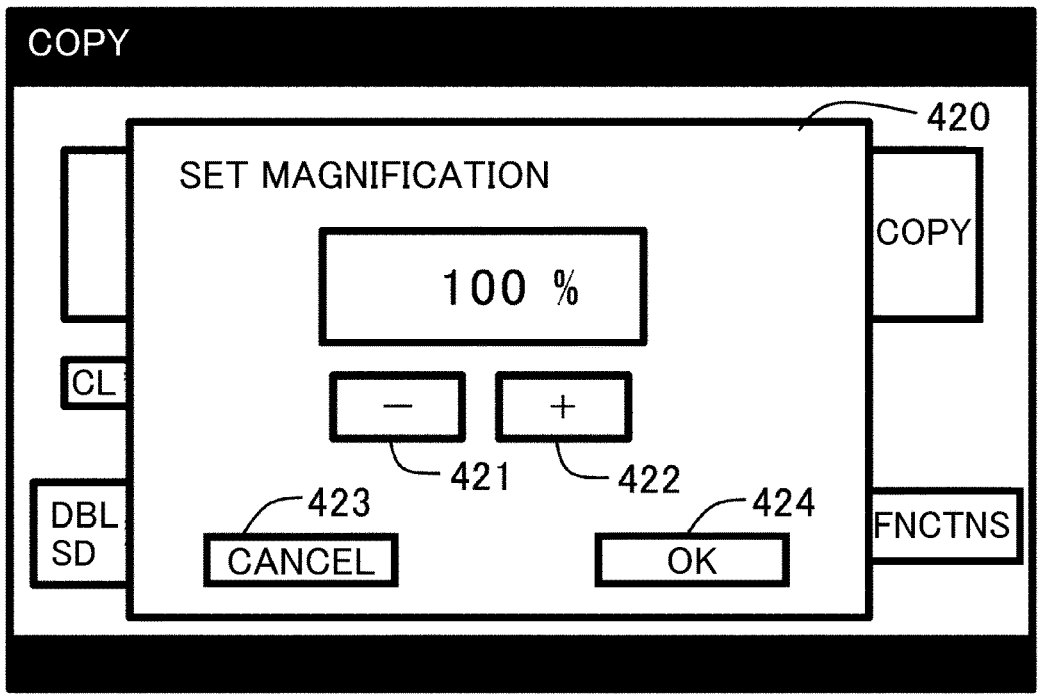
Figure 5:
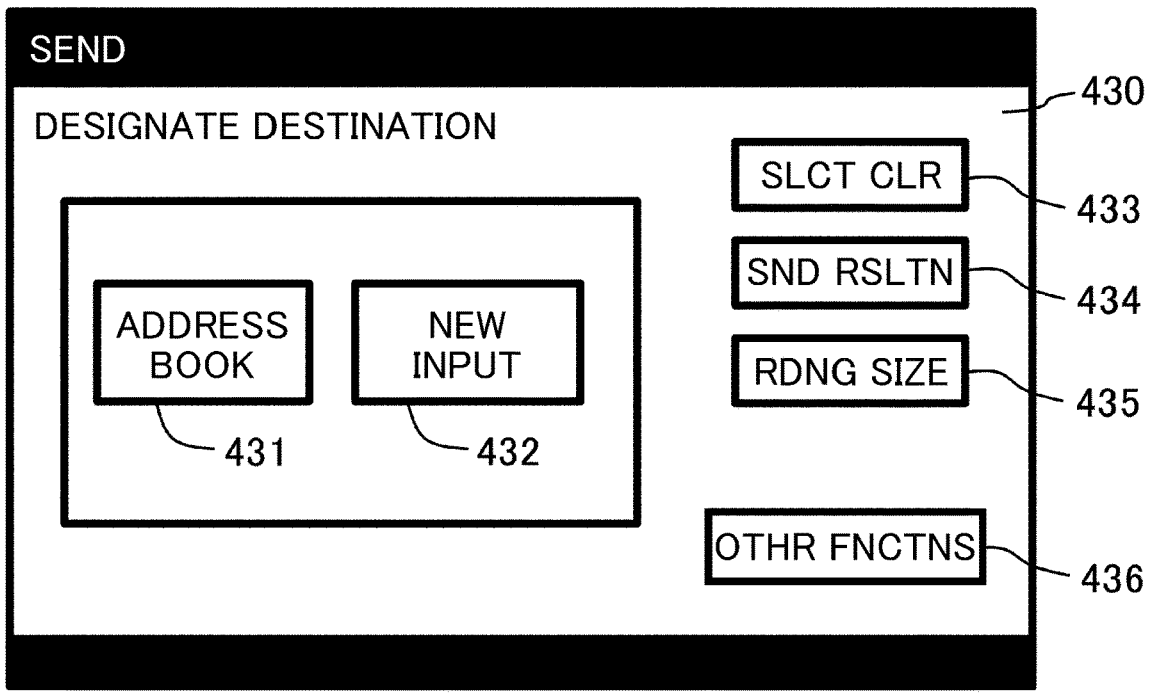

Parts (a) and (b) of FIG. 5 are schematic views each showing a display screen of the image reading apparatus of the embodiment, in which part (a) shows a magnification changing screen, and part (b) shows a "SEND" screen.

Figure 6:
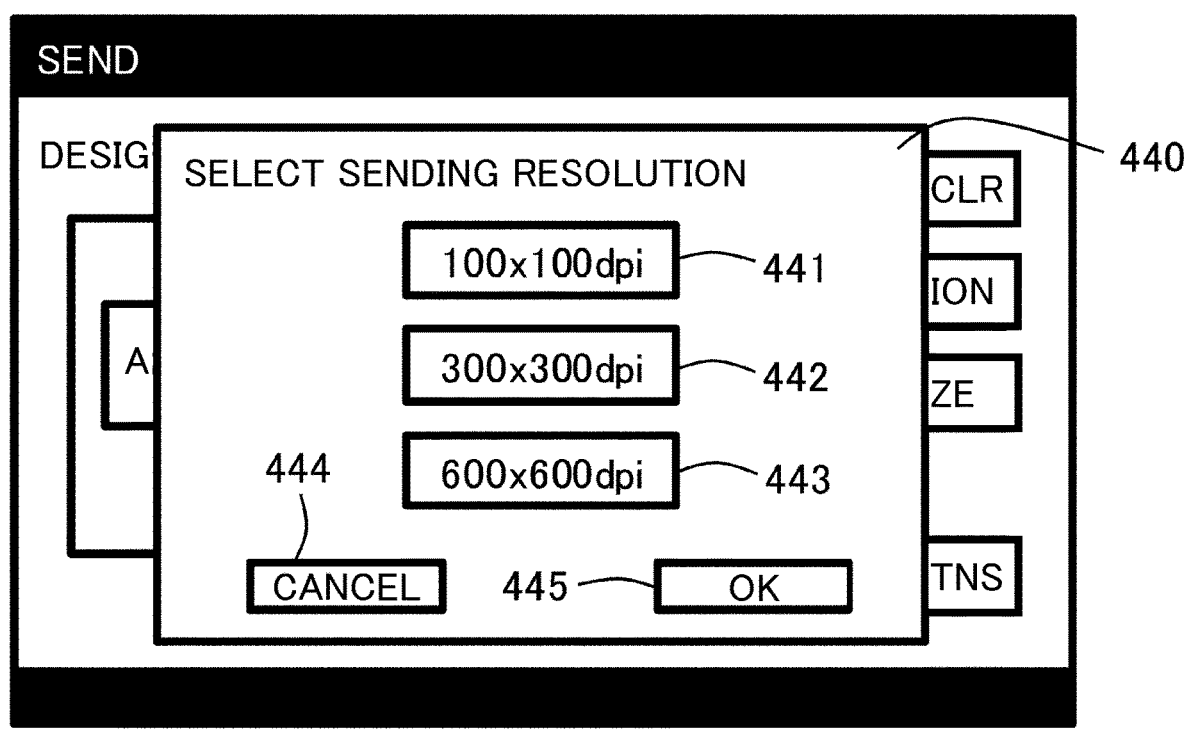

FIG. 6 is a schematic view showing a transmission resolution screen displayed on an operating portion of the image reading apparatus of this embodiment.

Figure 7:
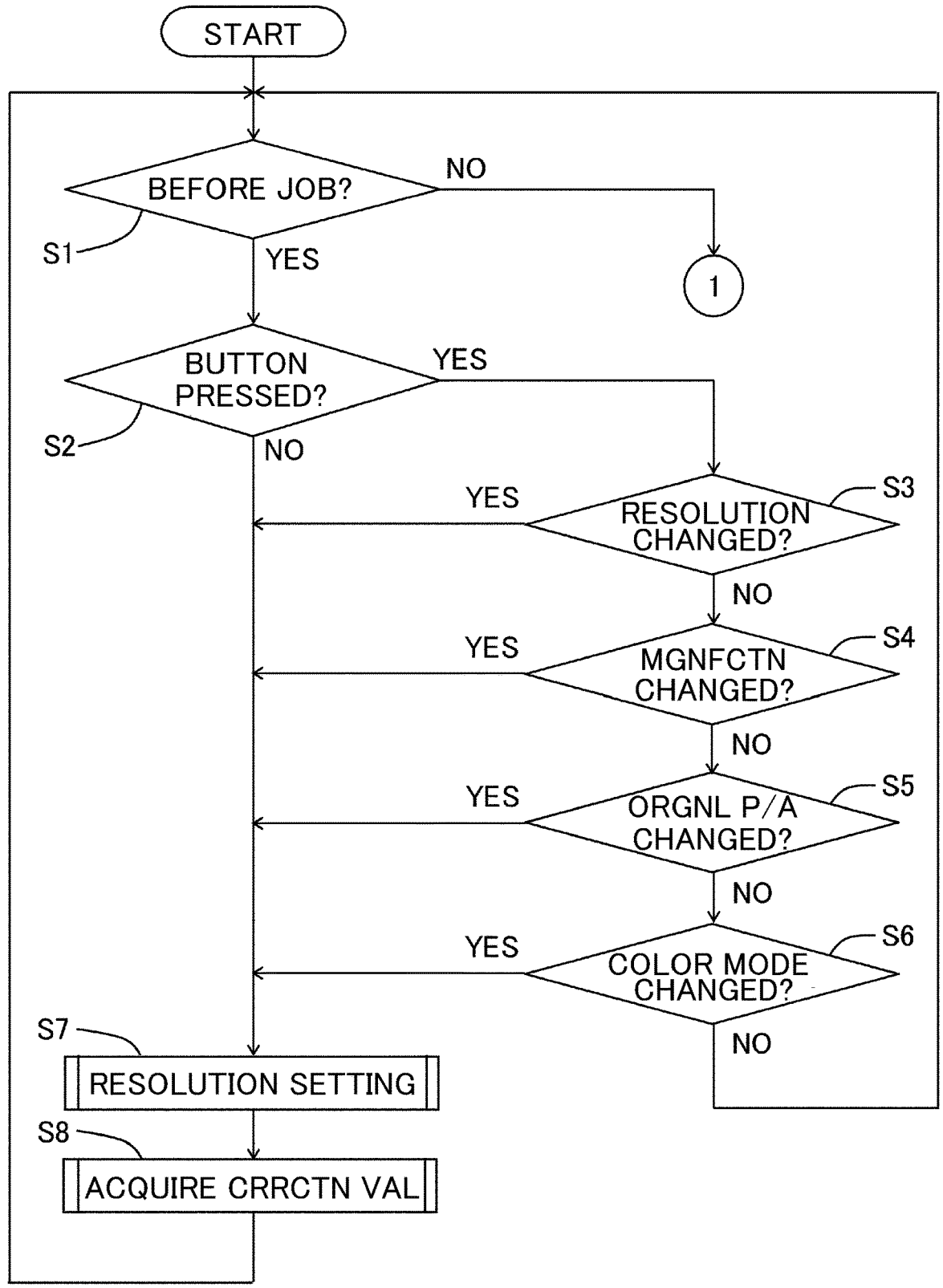

FIG. 7 is a first flowchart showing a process procedure in which a reading resolution is set before a start of a reading job in the image reading apparatus of this embodiment.

Figure 8:
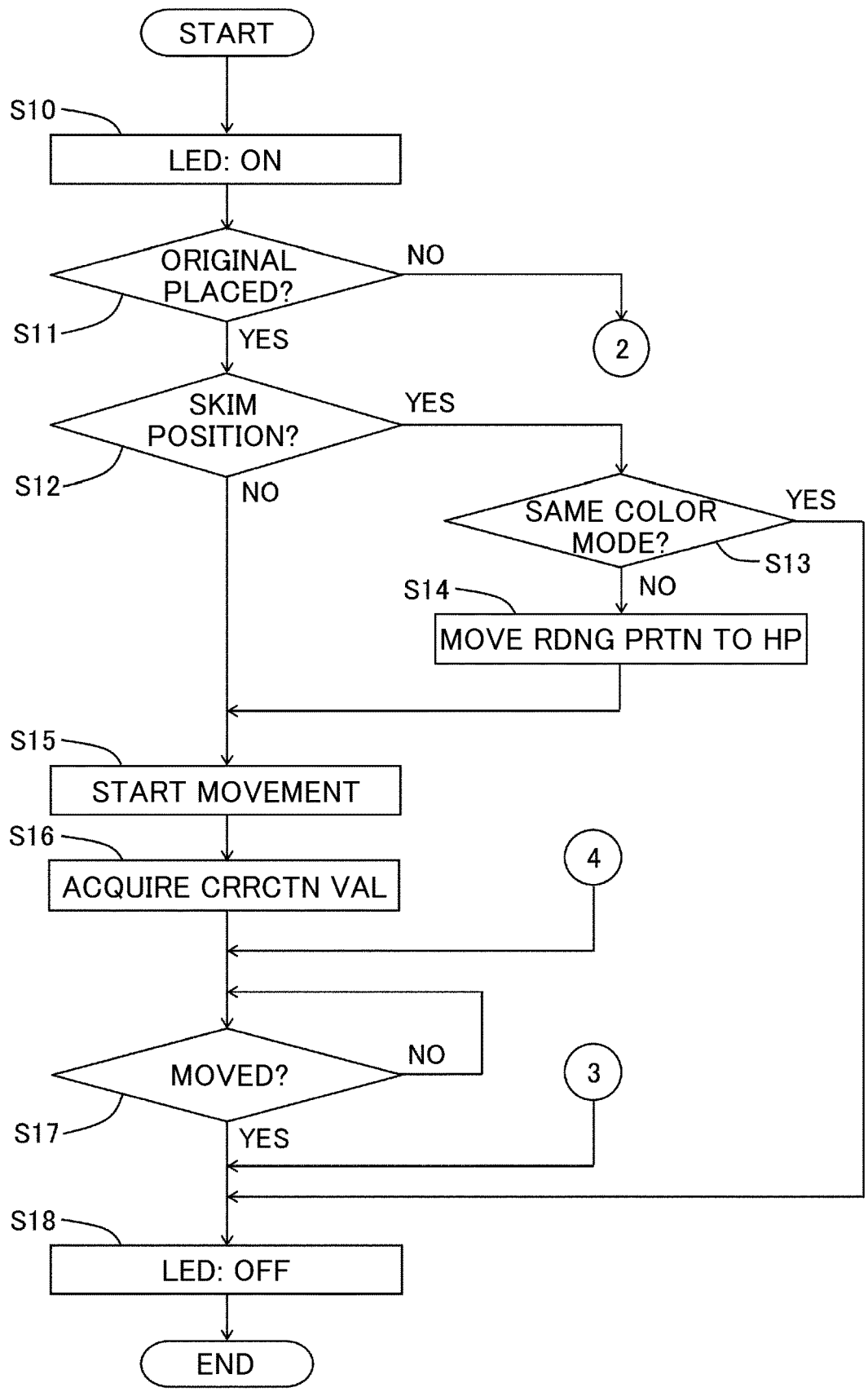

FIG. 8 is a second flowchart showing a process procedure in which a reading resolution is set before the start of the reading job in the image reading apparatus of this embodiment.

Figure 9:
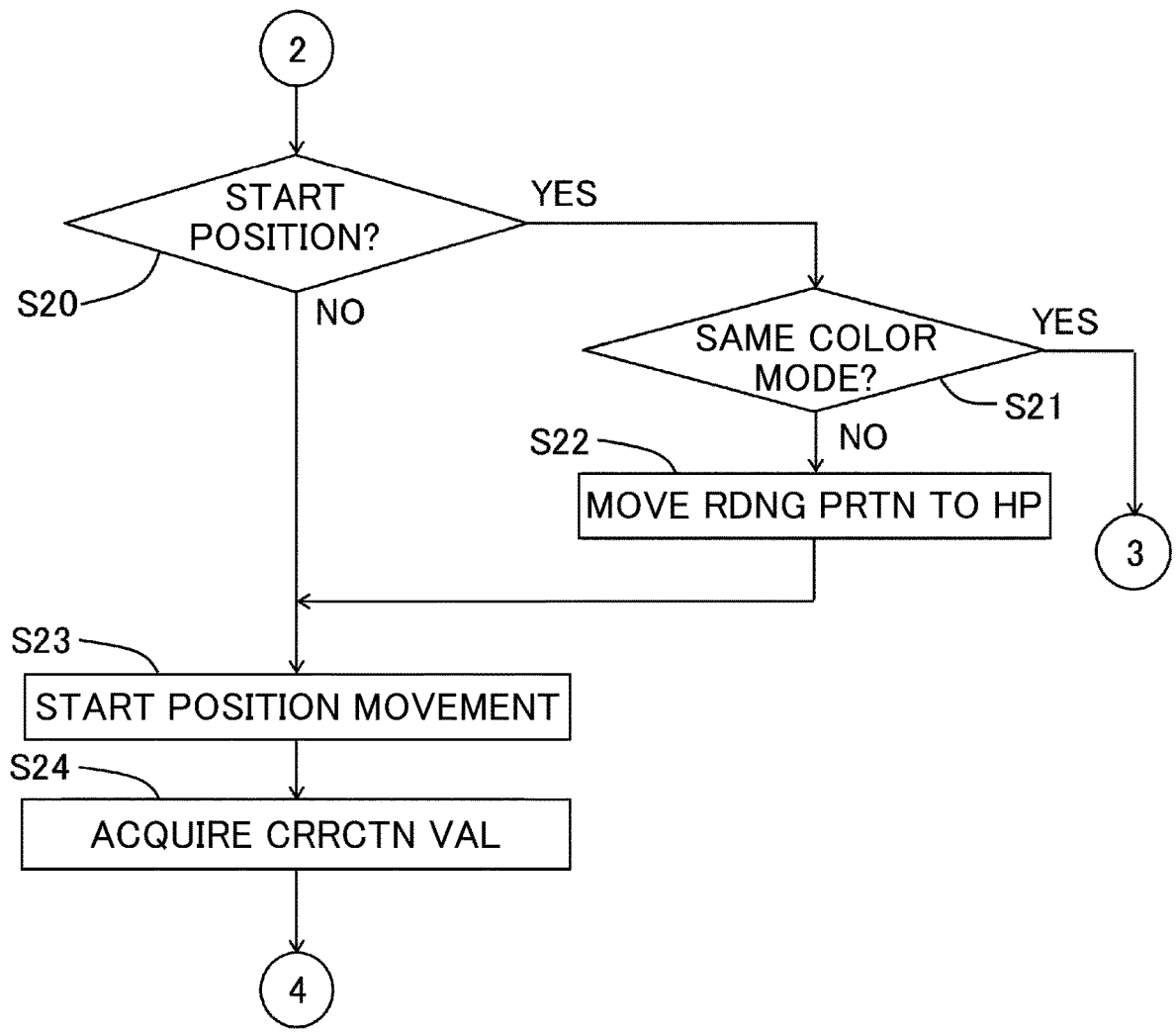

FIG. 9 is a third flowchart showing a process procedure in which a reading resolution is set before the start of the reading job in the image reading apparatus of this embodiment.

Figure 10:
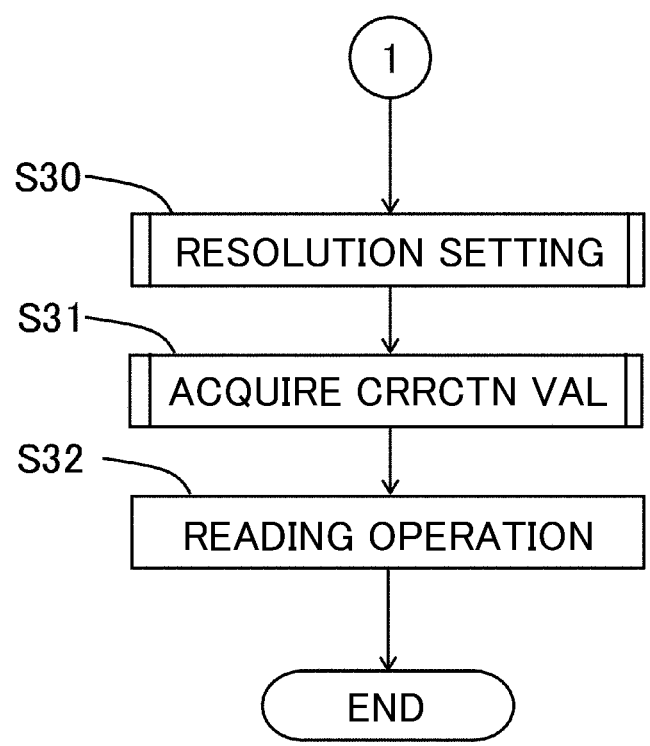

FIG. 10 is a flowchart showing a process procedure in which a reading resolution is set before the start of the reading job in the image reading apparatus of this embodiment.

Figure 11:
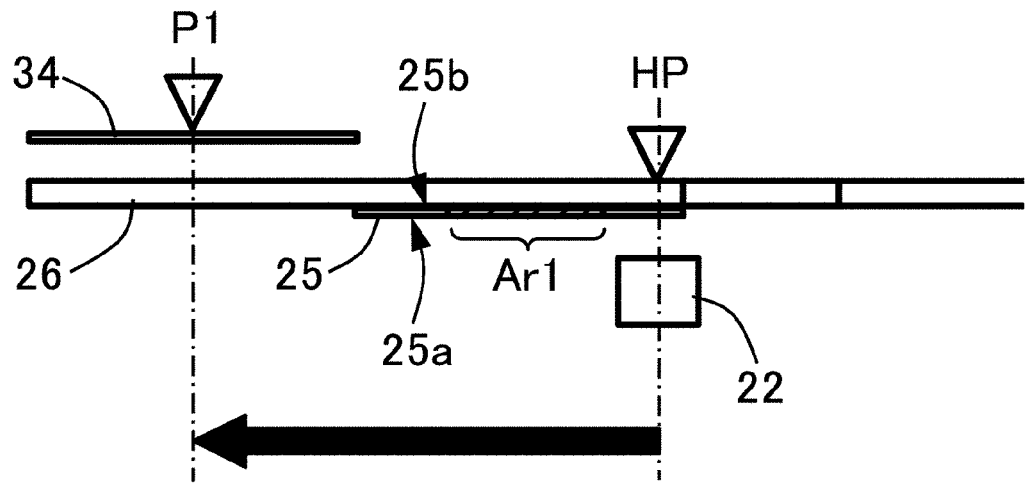
Figure 11:
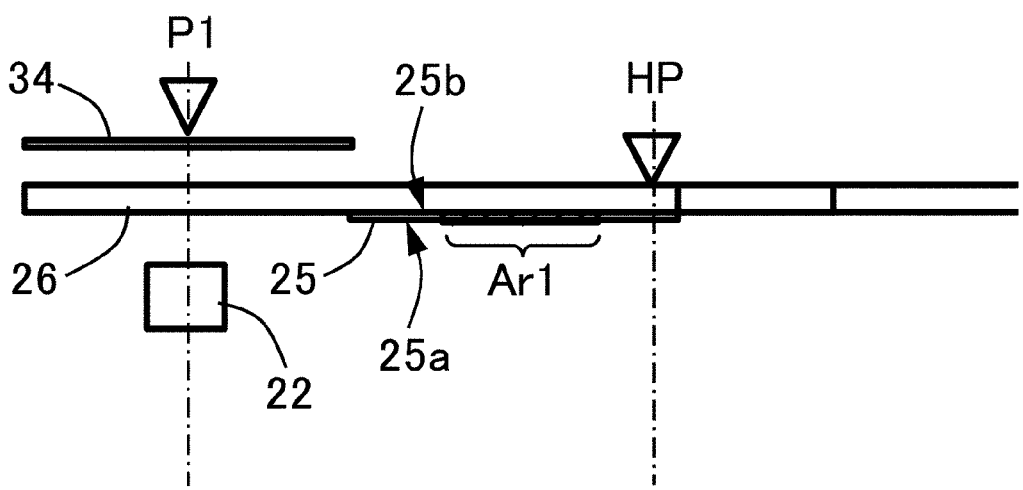

Parts (a) and (b) of FIG. 11 are sectional views when a skimming-through reading is executed in the image reading apparatus of this embodiment, in which part (a) shows the case where a surface reading portion is in a stand-by position, and part (b) shows the case where the surface reading portion is in a skimming-through position.

Figure 12:
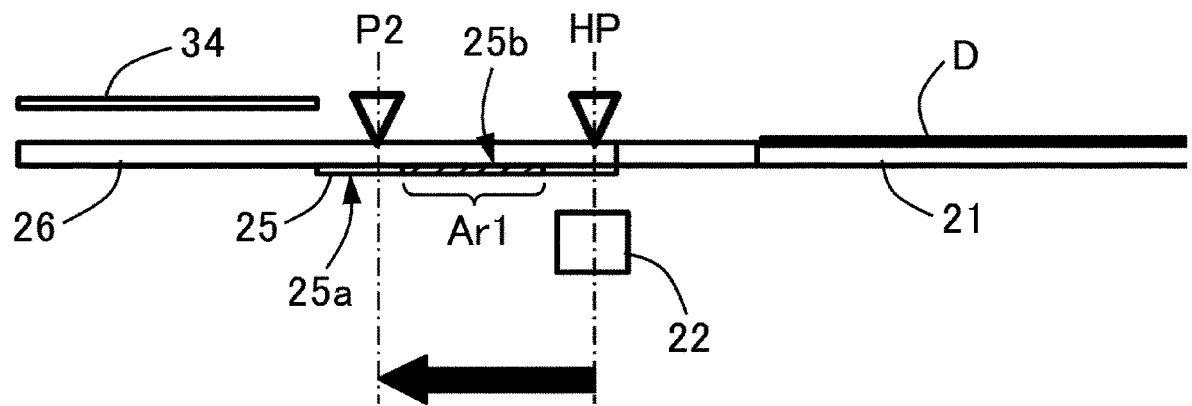
Figure 12:
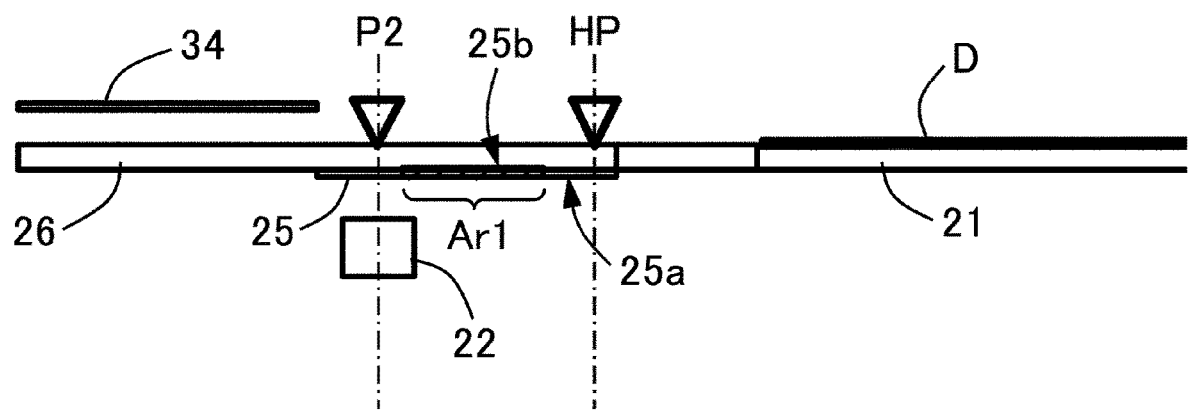

Parts (a) and (b) of FIG. 12 are sectional views when moving (fixed) reading is executed, in which part (a) shows the case where the surface reading portion is in the stand-by position, and part (b) shows the case where the surface reading portion is in a pressing plate acceleration starting position.

DESCRIPTION OF THE EMBODIMENTS

In the following, embodiments for carrying out the present invention will be described.

[Image Forming Apparatus]

Figure 1:
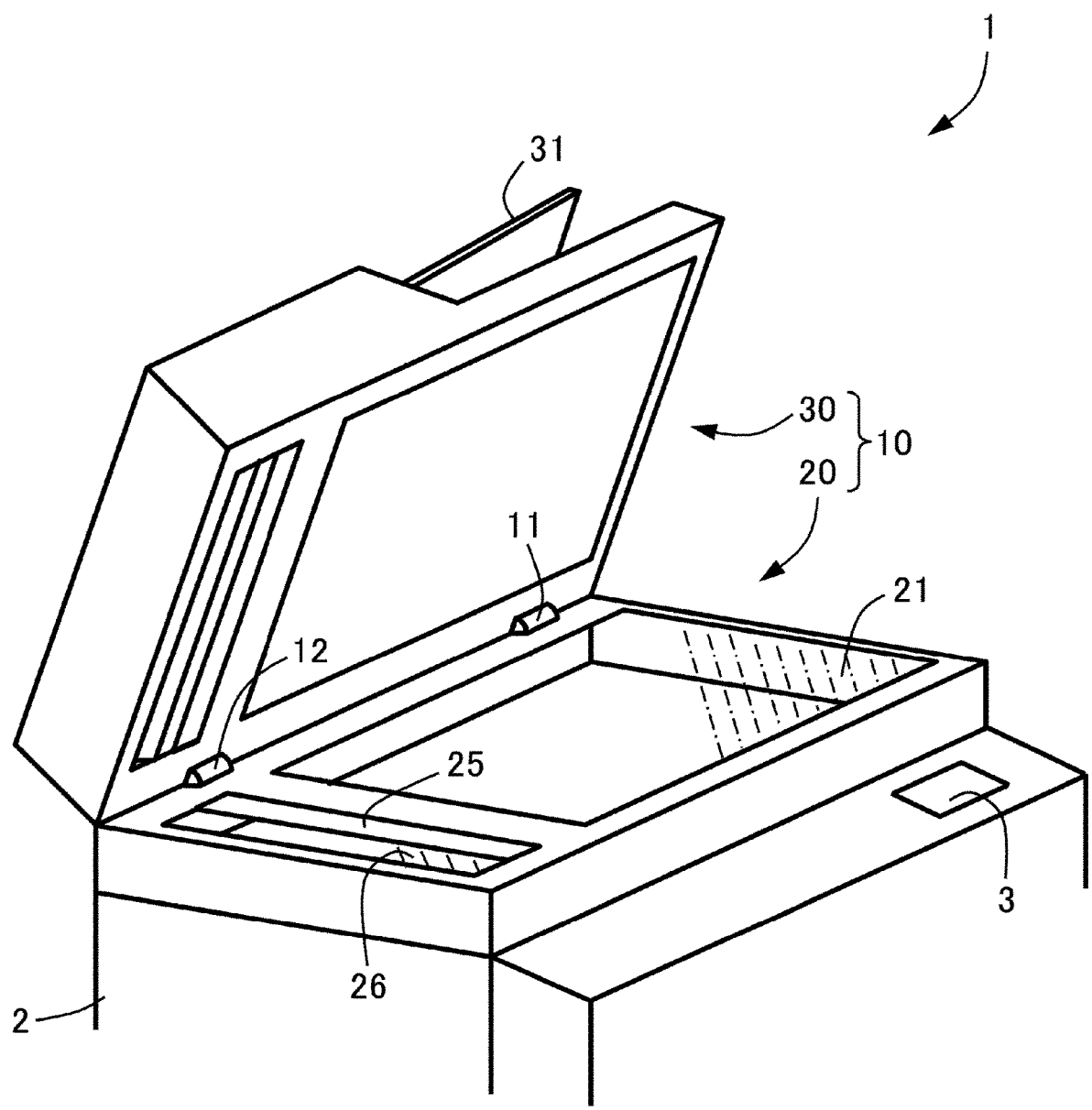
FIG. 1 is a perspective view of an image reading apparatus according to an embodiment.

First, a structure of an image forming apparatus 1 as an image reading apparatus will be described while making reference to FIG. 1. The image forming apparatus 1 is a multi-function machine including an apparatus main assembly 2 and the image forming apparatus 1. In this embodiment, with respect to the image forming apparatus 1, a position where a user faces an operating portion (operation portion) 3 through which input and shading of various pieces of information are carried out is a "front side", and a rear surface side is a "rear side". Further, a left-right direction when the image forming apparatus 1 is seen from the front side is a left-right direction as it is.

The apparatus main assembly 2 forms an image on a recording material used as a recording medium. That is, the apparatus main assembly 2 corresponds to an image forming portion for forming the image on the basis of image information of the image read by the image reading apparatus 10. The image reading apparatus 10 disposed on the apparatus main assembly 2 includes a reading apparatus main body 20 and an ADF 30 and reads the image information by optically scanning an original surface of an original, which is a sheet, on which an image has already been printed. The ADF 30 is connected to the reading apparatus main body 20 by a right-hand hinge 11 and a left-hand hinge 12 which are provided on an upper rear side of the reading apparatus main body 20 so as to be openable and closable relative to the reading apparatus main body 20. The sheet used as the recording material or the original includes paper such as thin paper or thick paper, a plastic film for an overhead projector (OHP) or the like, surface-treated paper such as coated paper, a particular-shaped sheet such as an envelope, and a cloth.

[Reading Apparatus Main Body]

Figure 2:
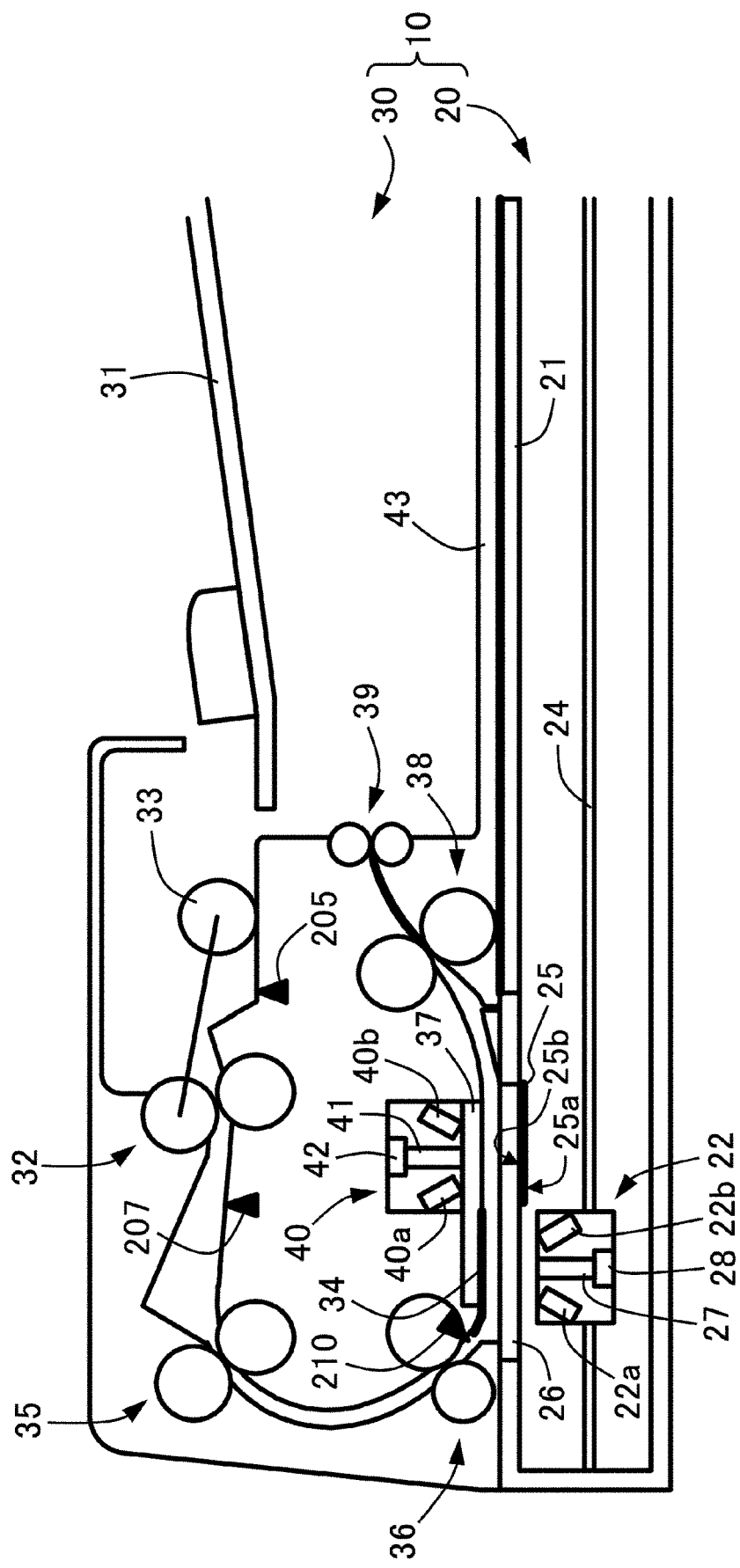
FIG. 2 is a sectional view of the image reading apparatus according to the embodiment.

As shown in FIG. 2, the reading apparatus main body 20 includes an original supporting platen glass 21, a surface reading portion (reading portion, first reading portion) 22, an optical motor (moving portion) 305 (FIG. 3), a reading movement guide 24, a surface skimming-through reading glass 26, and a white reference member (reference portion) 25. The reading apparatus main assembly 20 carries out reading of the image on the surface of the original by reading a surface (first surface) of the original, line by line, placed on the original supporting platen glass 21 while moving the surface reading portion 22 along the reading movement guide 24 by using the optical motor 305. Further, the original placed on the original supporting platen glass 21 is pressed and fixed by a white pressing plate when the ADF 30 is closed. The surface skimming-through reading glass 26 is provided integrally with the white reference member 25, and reads the image of the original, fed onto the surface skimming-through reading glass 26 by the ADF 30, by the surface reading portion 22.

In this embodiment, the white reference member 25 includes a downward first reference surface (first reference portion) 25a and an upward second reading surface (second reading portion) 25b. The first reference surface 25a of the white reference member 25 is read by the surface reading portion 22 for setting a shading correction value. The second reading surface 25b of the white reference member 25 is read by a back surface reading portion 40 described later for shading a shading correction value.

[ADF]

The ADF 30 includes an original tray 31 which is an example of an original stacking portion on which an original bundle constituted by one or more original, a separation roller pair 32 as a separating mechanism, and a pick-up roller 33. The original tray 31 includes an original presence/absence sensor 205 for detecting the presence or absence of the original. The pick-up roller 33 is dropped on an uppermost surface of the original bundle stacked on the original tray 31 and is rotated, whereby an uppermost original of the original bundle is fed. As regards the original fed by the pick-up roller 33, a single sheet of an uppermost original is separated and fed by action of the separation roller pair 32.

By this, the separation roller pair 32 restricts that the original bundle projects from the original tray 31 and then advances downward before a start of the feeding of the original. This separation is realized by a known separation technique.

The original separated by the separation roller pair 32 is fed and abutted against a registration roller pair 35. A leading end portion of the abutted original is formed in a loop shape, whereby oblique movement in feeding of the original is eliminated. On a side downstream of the registration roller pair 35, a feeding passage for feeding the original passed through the registration roller pair 35 toward a direction of the (front) surface skimming-through reading glass 26 is provided. The original fed to the feeding passage is fed to a double-side reading position by an upstream lead read pair 36. In the case of front surface (side) reading, the original which will pass through between the surface skimming-through reading glass 26 and the back surface skimming-through reading glass 37 is irradiated with light beams from front surface LEDs 22a and 22b from below the (front) surface skimming-through reading glass 26 when passes below the skimming-through guide 34. Reflected light beams from the front surface LEDs 22a and 22b are read by a front surface line sensor 28 through a front surface lens array 27, whereby the image on the front surface of the original is read. Incidentally, the pick-up roller 33, the separation roller pair 32, the registration roller pair 35, the upstream lead roller 36 and the like are an example of an original feeding portion. Further, the front surface line sensor 28 is an example of the image reading portion.

In the case of double-surface (side) feeding, the front surface of the original is read by the (front) surface reading portion 22 as described above. As regards a back surface (second surface) opposite from the front surface, the back surface of the original is irradiated with light beams from back surface LEDs 40a and 40b when the original passes above the white reference member 25 provided integrally with the (front) surface skimming-through reading glass 26. Reflected light beams from the back surface LEDs 40a and 40b are read by a back surface line sensor 42 through a back surface lens away 41, whereby the image on the back surface of the original is read. The original fed by the downstream lead roller pair 38 is discharged onto a discharge tray 43 by a discharging roller pair 39. The back surface reading portion 40 is fixed to the ADF 30 in a state in which the back surface reading portion 40 is opposed to a second reference surface 25b of the white reference member 25. The original fed by the ADF 30 is fed between the back surface reading portion 40 and the second reference surface 25b.

As the front surface reading portion 22 and the back surface reading portion 40 which are an example of the image reading portion, a contact image sensor (CIS) of a one-to-one optical system is used. The contact image sensor reads image information by irradiating an image surface of the original with light from the LED as a light source and by imaging reflected light, reflected by the image surface, on each of the front surface line sensor 28 and the back surface line sensor 42, and then by photoelectrically converting the resultant image into the image information. In this embodiment, as the front surface reading portion 22 and the back surface reading portion 40, the CIS is used, but the surface reading portions are not limited thereto. As the surface reading portions, a CCD constituted by a reduction optical system using a lens array and a mirror is also applicable.

[Controller]

Figure 3:
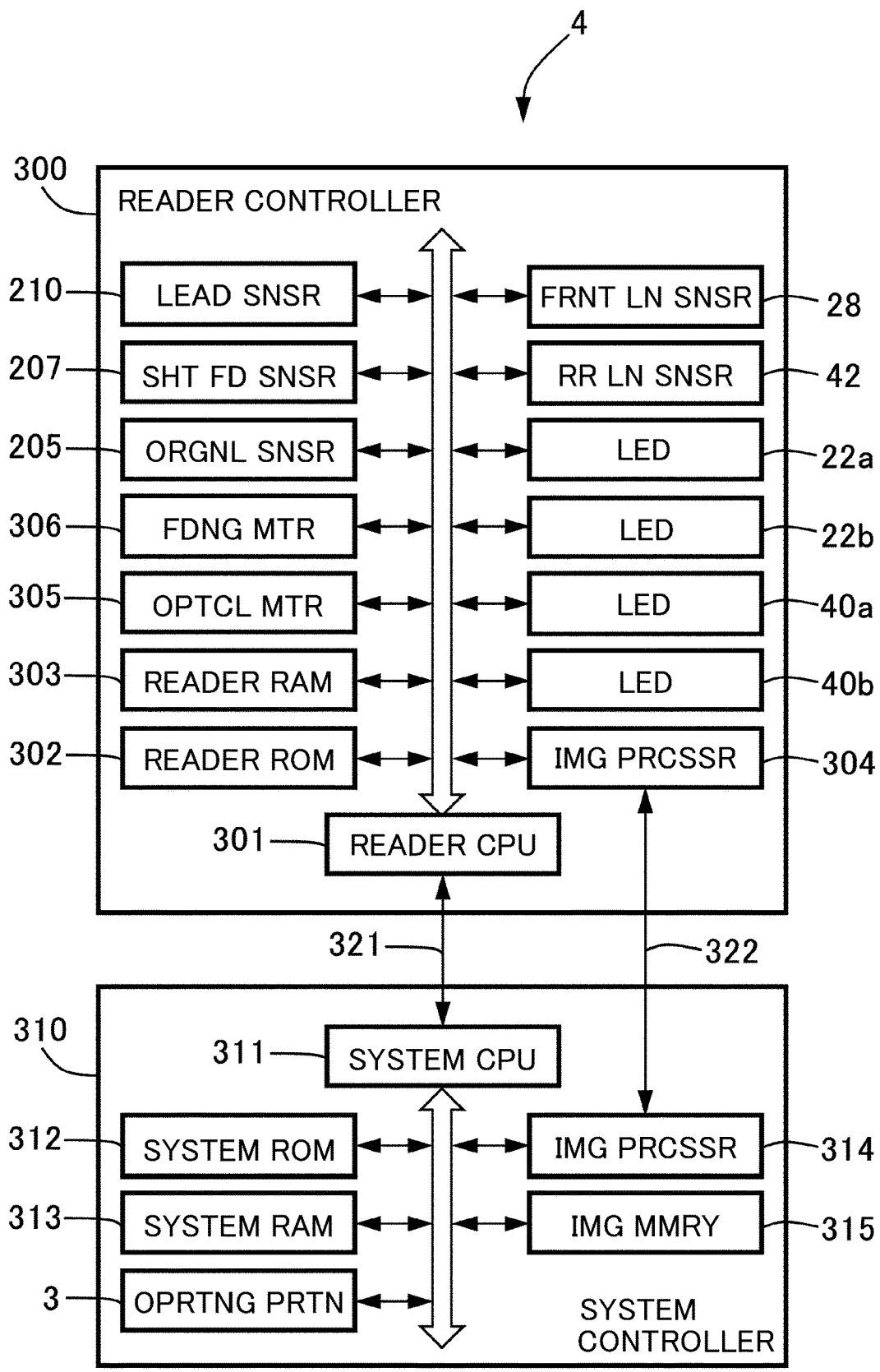
FIG. 3 is a block diagram showing a control system of the image reading apparatus according to the embodiment.

FIG. 3 is a block diagram of a controller 4 of the image reading apparatus 10. The controller 4 includes a reader controller 300 and a system controller 310. The reader controller 300 includes a reader CPU 301 which is a central processing unit, a reader ROM 302 which is a read-only memory, and a reader RAM 303 which is a random-access memory. In the reader ROM 302, a control program is stored, and in the reader RAM 303, input data and operation data are stored. To the reader CPU 301, in order to realize an original feeding function, a feeding motor 306 for driving respective rollers the feeding is connected. The roller is connected to the feeding motor 306 through, for example, a clutch for switching drive and a stop of the device.

Further, to the reader CPU 301, an original presence/absence sensor 205 for detecting the original stacked on the original tray 31, a sheet (paper) feeding sensor 207 and a lead sensor 210 are connected. The feeding motor 306 in this embodiment is a pulse motor, and the reader CPU 301 controls pulses of respective motors by controlling the number of driving pulses. The number of the pulses can be grasped as a feeding distance of the original during the feeding, and the reader CPU 301 controls respective loads and carries out the feeding of the original, on the basis of the feeding distance calculated from a motor pulse.

To the reader CPU 301, in order to realize an original reading function, the front surface LEDs 22a and 22b and the front surface line sensor 28 are connected. The reader CPU 301 subjects image data, read by the front surface line sensor 28, to various image processing in an image processing portion 304 and then transmits the processed image data to the system controller 310 through an image data bus 322. Further, the reader CPU 301 notifies the system controller 310, through a controller 1F, of a vertical synchronizing signal which is a reference of a leading end of the original image data and a horizontal synchronizing signal which is a reference of a pixel leading end of one line, in synchronism with timing of original reading.

In the system controller 310, a system CPU 311, a system ROM 312 and a system RAM 313 are provided, and data transfer relating to original reading control between the system controller 310 and the reader controller 310 is carried out through a command data bus 321. The image data processed by the image processing portion 304 is transferred to an image processing portion 314 in the system controller 310 through the image data bus 322 and is subjected to predetermined image processing such as discrimination of a color or the like, and then is stored in an image memory 315. Further, the system controller 310 is connected to the operating portion 3, and interface control between the system controller 310 and a user is carried out by the system CPU 311 through the operating portion 3. Incidentally, the operating portion 3 is constituted by a display panel capable of liquid crystal display and touch input.

[Screen of Operating Portion]

A screen example displayed on the operating portion 3 in this embodiment will be described by using part (a) of FIG. 4 to FIG. 6. In part (a) of FIG. 4, an example of a top menu screen displayed on the operating portion 3 is shown. By pressing down buttons with various functions displayed on a top menu screen 400, the screen 400 shifts to a screen for setting a job and for starting the job. A copy button 401 is a button for shifting to a copy screen on which a copy function is executed. A "SEND" button 402 is a button for shifting to a "SEND" screen for sending (transmitting) the image data to an external device by executing a facsimile function. A print button 403 is a button for shifting to a print screen on which a printing function of a document is executed.

As shown in part (b) of FIG. 4, on the copy screen 410 to which the top menu screen 400 is shifted by pressing down the copy button 401 (part (a) of FIG. 4), as basic setting, a color selection button 411, a magnification button 412 and a sheet selection button 413 are provided. Further, a setting status of these buttons is displayed at a setting display portion 417. Setting other than the basic setting is selectable by pressing down an "OPTION" (other functions) button 416. Here, although not illustrated, as other functions ("OPTION" button 416), various functions such as page printing, page aggregation and bookbinding are prepared. Of these functions, as regards the function frequently used by the user, a shortcut button is capable of being prepared on the copy screen. In this embodiment, a double-side (printing) button 414 for setting double-side printing and a finish button 415 for setting an output mode during the printing and post-processing are prepared.

As shown in part (a) of FIG. 5, on a magnification screen displayed by pressing down the magnification button 412 (part (b) of FIG. 4), magnification which is intended to be designated by the user is changeable by a minus (−) button 421 a plus (+) button 422. After the magnification is changed, the magnification is determined by pressing down an "OK" button 424, or setting change can be cancelled by pressing down a "CANCEL" button 423. In this embodiment, in part (a) of FIG. 5, the setting change of the magnification is regarded as being finalized when the "OK" button 424 is pressed down, and then whether or not a change in preset reading resolution (600 dpi which is a predetermined reading resolution) is needed.

As shown in part (b) of FIG. 5, on the "SEND" screen 430 to which the top menu screen 400 is shifted by pressing down the "SEND" button 402 (part (a) of FIG. 4), as basic setting, a color selection button 433, a transmission resolution button 434 and a reading size button 435 are provided. Setting other than the basic setting is selected by pressing down an "OPTION" (other functions) button 436. As regards a transmission destination, setting of a new transmission destination can be made by being selected from an unshown address book displayed by an address book button 431 or from a new input button 432.

As shown in FIG. 6, on a transmission resolution screen 440 displayed by pressing down the transmission resolution button 434 (part (b) of FIG. 5), buttons for the transmission resolution are displayed. In this embodiment, a 100×100 dpi button 441, a 300×300 dpi button 442 and a 600×600 dpi button 443 are provided, and 300×300 dpi is selected as default setting. After the transmission resolution is changed, the transmission resolution is determined by pressing down an "OK" button 445, or setting change can be cancelled by pressing down a "CANCEL" button 444. In this embodiment, in FIG. 6, the setting change of the magnification is regarded as being finalized when the "OK" button 445 is pressed down, and then whether or not a change in preset reading resolution (600 dpi which is a predetermined reading resolution) is needed.

Here, in the image reading apparatus 10 of this embodiment, before the original feeding in a reading job, specifically, when the original is stacked on the original tray 31, operations (1) actuation of the reading sensor (CMOS), (2) lighting of the LEDs, (3) optical adjustment (shading) and (4) original of an optical unit to a reading position are performed. Further, in the case where a correction value acquiring process for acquiring a shading correction value is carried out in advance of a start of the reading job, a process of acquiring the shading correction value is carried out by reading the white reference member 25 with a preset predetermined reading resolution, for example, 600 dpi.

However, after the original is stacked on the original tray 31, for example, in the case where setting of the magnification is changed to 50% in the copying process or in the case where the transmission resolution of facsimile transmission is set at 300 dpi, the image reading process is carried out with 300 dpi which is the changed reading resolution. For this reason, the reading resolution obtained by carrying out the correction value acquiring process before the start of the reading job and an actual reading resolution after the reading job are different from each other in some cases. In the cases, there is a need to perform the correction value acquiring process gain after the start of the reading job.

The reason why the correction value acquiring process is performed again is that (1) actuation of the reading sensor (CMOS), (2) lighting of the LEDs and (3) optical adjustment (shading) result from a change in drive frequency of the reading sensor depending on the color mode and resolution. That is, in the case where values of the resolution prepared in advance are different from each other, there is a need to perform the correction value acquiring process again in order to change the drive frequency of the front surface line sensor 28 or the back surface line sensor 42. In the case where the correction value acquiring process is performed again, the front surface line sensor 28 or the back surface line sensor 42 is actuated again and the position of the optical unit is returned to an original position, and then the shading process has to be carried out, and therefore, there is a liability that the actuation of the reading sensor is delayed compared with the case where the reading sensor is actuated after the reading job is ordinarily started. By this, due to the change in reading resolution after the start of the reading job, the image reading process is delayed correspondingly to the correction value acquiring process performed again, and therefore, there was a possibility that a FCOT (First Copy Output Time) is delayed. Therefore, in this embodiment, in order to shorten a time from a reading start instruction to output of a first sheet, a proper reading resolution is set before the start of the reading job, and on the basis of the reading resolution, the shading correction value is acquired.

In the following, a process procedure for setting the reading resolution before the start of the reading job in the image reading apparatus of this embodiment will be described by using flowcharts of FIGS. 7 to 9. In this embodiment, assuming that only the front surface of the original is read, a procedure of setting the reading resolution in the corresponding front surface reading portion 22 will be described.

First, the process before the start of the reading job is carried out in such a manner that the system CPU 311 of the system controller 310 reads a control program, developed in the system RAM 313, from the system ROM 312 and then executes the control program. The top menu screen 400 shown in part (a) of FIG. 4 is displayed, and then a series of processes shown on the top menu screen is started.

The system CPU 311 discriminates whether or not the reading job is before the start (step S1). In the case where the system CPU 311 discriminated that the reading job is before the start (YES of step S1), the system CPU 311 discriminates whether or not pressing-down of the copy button 401 or the SEND button 402 is detected (step S2). In the case where the system CPU 311 discriminated that the pressing-down of the copy button 401 or the SEND button 402 is detected (YES of step S2), the system CPU 311 discriminates whether or not the transmission resolution is changed (step S3). The change in transmission resolution is made by selecting the transmission resolution from the transmission resolution screen 440 shown in FIG. 6 and then by pressing down the OK button 445.

In the case where the system CPU 311 discriminated that the transmission resolution is not changed (NO of step S3), the system CPU 311 discriminates whether or not the magnification is changed (step S4). The change in magnification is made by changing the magnification from the magnification screen 420 shown in part (a) of FIG. 5 and then by pressing down the OK button 424. In the case where the SY CPU 311 discriminated that the magnification is not changed (NO of step S4), the SY CPU 311 discriminates whether or not the presence or absence (state) of the original on the original tray 31 is changed (step S5).

Here, in this embodiment, by the presence or absence of the original on the original tray 31, the reading resolution is unchanged. However, an acquiring flow of the shading correction value described later, the shading correction value is different between those for skimming-through reading and for a pressing (pressure) plate, and therefore, the change in presence or absence of the original on the original tray 31 is discriminated as an element for executing a process of acquiring the shading correction value.

In the case where the system CPU 311 discriminated that the presence or absence of the original on the original tray 31 is not changed (NO of step S5), the SY CPU 311 discriminates whether or not the color ode is changed (step S6). The color mode can be changed by the color selection button 411 shown in part (b) of FIG. 4 or the color selection button 433 shown in part (b) of FIG. 5, and is changed pressing down any of unshown buttons such as a monochromatic button, a color button or an automatic button. The color mode is selected for executing the shading correction of the monochromatic line sensor in each of the front surface line sensor 28 and the back surface line sensor 42. In the case where the system CPU 311 discriminated that the color mode is not changed (NO of step S6), the process returns to the step S1.

On the other hand, in the step S2, in the case where the system CPU 311 discriminated that the pressing-down of the copy button 401 or the SEND button 402 is not detected (NO of step S2), the reading resolution is set in a state before the job start (step S7, resolution setting process). This is also true for the case where the system CPU 311 discriminated that the transmission resolution was changed (YES of step S3) and in the case where the system CPU 311 discriminated that the magnification was changed (YES of step S4). Further, the above is also true for the case where the system CPU 311 discriminated that the presence or absence of the original on the original tray 31 was changed (YES of step S5) and in the case where the system CPU 311 discriminated that the color ode was changed (YES of step S6). Incidentally, as described above, in this embodiment, the shading change is regarded as being finalized at a point of time when the OK button is pressed down on the screen of part (a) of FIG. 5 or FIG. 6. However, the present invention is not limited thereto. For example, in a state in which an item of the magnification or the transmission resolution is selected by the user on the setting screen of FIG. 5 or FIG. 6, discrimination that the setting is changed is made and then a resolution change instruction to change the reading resolution may also be notified to the user.

The system CPU 311 sets the reading resolution portion a job kind (function) or job setting information or the like. In this embodiment, the reading resolution is determined on the basis of the job kind, the magnification and the transmission resolution. However, the present invention is not limited thereto, but the reading resolution may also be directly designated by the user. Here, in a table 1, values of the reading resolution ("RDNG RSLTN" corresponding to the job kind (function) ("FNCTN"), the magnification ("MGNFCTN") and the transmit resolution ("TRNSMSN RSLTN") are shown.

TABLE 1

| FNCTN | MGNFCTN | TRNSMSN RSLTN | RDNG RSLTN |
|---|---|---|---|
| COPY | 50%≤ | — | 600 × 600 dpi |
| COPY | <50% | — | 300 × 300 dpi |
| SEND | 50%≤ | 100 × 100 dpi | 300 × 300 dpi |
| SEND | <50% | 100 × 100 dpi | 300 × 300 dpi |
| SEND | 50%≤ | 300 × 300 dpi | 300 × 300 dpi |
| SEND | <50% | 300 × 300 dpi | 300 × 300 dpi |
| SEND | 50%≤ | 600 × 600 dpi | 600 × 600 dpi |
| SEND | <50% | 600 × 600 dpi | 300 × 300 dpi |

As shown in the table 2, basically, in order to prevent deterioration of an image quality by a resolution conversion process of the image processing portion 314, the reading resolution is determined so as to become a resolution higher than a resolution of the image data outputted finally. Further, as regards discrimination of the job kind before the start of the reading job, the job kind is discriminated as the copy job when the copy screen 410 (part (b) of FIG. 4) is displayed on the operating portion 3, and is discriminated as the SEND job when the SEND screen 430 (part (b) of FIG. 5) is displayed on the operating portion 3. As regards the magnification and the transmission resolution before the start of the reading job, on the copy screen 410 or the SEND screen 430, when the setting is not changed, a default set value is used, and when the setting is changed, a set value after the change is used.

After the reading resolution is determined in the step S7, the system CPU 311 notifies the reader CPU 301, of the reader controller 300, of the determined reading resolution and the color mode as a resolution change instruction, through the command data bus 321. The reader CPU 301 which received this resolution change instruction executes the shading operation described later. Thereafter, the system CPU 311 acquires the shading correction value by a process procedure described later (step S8, correction value setting process).

Next, the process procedure of acquiring the shading correction value in this embodiment will be described by using flowcharts shown in FIGS. 8 and 9. This process is carried out by reading a control program, developed in the reader RAM 303, from the reader ROM 302 and then by executing the control program. First, the reader CPU 301 turns on the LEDs 22a and 22b (step S10). The reader CPU 301 discriminates whether or not the original is present on the original tray 31 by using a detection result of the original presence/absence sensor 205 (step S11).

In the case where the reader CPU 301 discriminated that the original was present on the original tray 31 (YES of step S11), the reader CPU 301 performs the shading operation with a preset resolution (600 dpi). First, the reader CPU 301 discriminates whether or not the front surface reading portion 22 (reading portion) is in a skimming-through P (first region) P1 (step S12). Here, the skimming-through position P1 of the front surface reading portion 22 is a position below the front surface skimming-through reading glass 26 and below the skimming-through reading guide 34 as shown in FIG. 2 and part (b) of FIG. 11.

In the case where the reader CPU 301 discriminated that the front surface reading portion 22 was in the skimming-through reading position P1 (YES of step S12), the reader CPU 301 discriminates the reading resolution and the color mode. That is, the reader CPU 301 discriminates whether or not the reading resolution and the color mode which are currently notified from the system CPU 311 of the system controller 310 and the reading resolution and the color mode which are last notified are identical to each other, respectively (step S13).

In the case where the reader CPU 301 discriminated that the reading resolution and the color mode are identical to those last notified (YES of step S13), there is no need to acquire the shading correction value, and therefore, the reader CPU 301 puts the LEDs 22a and 22b in an off state (step S18), and then ends the process. In the case where the reader CPU 301 discriminated that the reading resolution and the color mode are not identical to those last notified (NO of step S13), the reader CPU 301 causes the front surface reading portion 22 to move as shown in part (a) of FIG. 11 (step S14). In this embodiment, the reader CPU 301 drives the optical motor 305 (FIG. 3) and moves the front surface reading portion 22 to a stand-by position HP (home position) which is an end of the white reference member 25.

In the case where the reader CPU 301 discriminated that the front surface reading portion 22 is not in the skimming-through reading position P1 (NO of FIG. 12) or in the case where the front surface reading portion 22 was moved to the stand-by position HP (step S14), the reader CPU 301 causes the front surface reading portion 22 to move to the skimming-through reading position P1 (step S15). By this, as shown in part (a) of FIG. 11, the front surface reading portion 22 moves in a black arrow direction (leftward).

During movement of the front surface reading portion 22 moves to the skimming-through reading position P1, the reader CPU 301 acquires the shading correction value in a shading region (second region) Ar1 of the white reference member 25 (step S16). The shading region Ar1 (white reference member 25) is provided adjacent to the skimming-through reading position P1 with respect to the sub-scan direction. In this embodiment, the reader CPU 301 acquires the shading correction value depending on the reading resolution and the color mode which were notified by the system CPU 311. That is, the optical motor 305 (FIG. 3) causes the front surface reading portion 22 to move in the sub-scan direction so that the front surface reading portion 22 is positioned in the shading region Ar1 different from the skimming-through reading position P1 during reading of the white reference member 25. The reader CPU 301 continues the movement until the front surface reading portion 22 reaches the skimming-through reading position P1 (step S17). That is, as shown in parts (a) and (b) of FIG. 11, shading correction is carried out in the shading region Ar1, and the front surface reading portion 22 moves to the skimming-through reading position P1.

In the case where the reader CPU 301 discriminated that the movement of the front surface reading portion 22 to the skimming-through reading position P1 was completed (YES of surface S17), the reader CPU 301 puts the LEDs 22a and 22b in the off state (step S18), and then ends the process. Incidentally, as regards the skimming-through reading glass 26, a read image becomes dark when the glass surface is subjected to processing, such as antistatic coating, for preventing electrification and dust deposition (adhesion). For this reason, in order to provide the same value as the value of the image read on the original supporting platen glass 21, the shading correction value for the skimming-through reading is set at a value obtained by multiplying the shading correction value for the pressing plate by predetermined coefficient.

On the other hand, in the case where the reader CPU 301 discriminated that the original in absent on the original tray 31 (NO of step S11), the reader CPU 301 discriminates that the original D is placed on the original supporting platen glass 21 as shown in part (a) of FIG. 12. In this case, the first region in which the reading of the original D is carried out may only be required to be at least a part of the original supporting platen glass 21, and in this embodiment, in an entire region of the original supporting platen glass 21. The front surface reading portion 22 reads an image of the original D placed on the original supporting platen glass 21 while moving in the sub-scan direction. Further, also in this case, the shading region Ar1 (white reference member 25) is provided adjacent to the original supporting platen glass 21 with respect to the sub-scan direction.

The reader CPU 301 discriminates whether or not the front surface reading portion is in a pressing plate acceleration starting position P2 (part (a) of FIG. 12) (step S20). In the case where the reader CPU 301 discriminated that the front surface reading portion 22 was in the pressing plate acceleration starting position P2 (YES of step S20), the reader CPU 301 discriminates the reading resolution and the color mode. That is, the reader CPU 301 discriminates whether or not the reading resolution and the color mode which are currently notified from the system CPU 311 of the system controller 310 and the reading resolution and the color mode which are last notified are identical to each other, respectively (step S21).

In the case where the reader CPU 301 discriminated that the reading resolution and the color mode are identical to those last notified (YES of step S21), there is no need to acquire the shading correction value, and therefore, the reader CPU 301 puts the LEDs 22a and 22b in an off state (step S18), and then ends the process. In the case where the reader CPU 301 discriminated that the reading resolution and the color mode are not identical to those last notified (NO of step S21), the reader CPU 301 causes the front surface reading portion 22 to move to the stand-by position HP (home position) which is an end of the white reference member 25, as shown in part (a) of FIG. 12 (step S22).

After the front surface reading portion 22 was moved to the stand-by position HP or in the case where the reader CPU 301 discriminated that the front surface reading portion 22 is not in the pressing plate acceleration starting position P2 (NO of FIG. 20), the reader CPU 301 causes the front surface reading portion 22 to move to the pressing plate acceleration starting position P2 (step S23). By this, as shown in part (a) of FIG. 12, the front surface reading portion 22 moves in a black arrow direction (leftward).

During movement of the front surface reading portion 22 moves to the pressing plate acceleration starting position P2, the reader CPU 301 acquires the shading correction value in the shading region Ar1, depending on the reading resolution and the color mode which were notified by the system CPU 311 (step S24). The reader CPU 301 continues the movement until the front surface reading portion 22 reaches the pressing plate acceleration starting position P2 (step S17). That is, as shown in parts (a) and (b) of FIG. 12, shading correction is carried out in the shading region Ar1, and the front surface reading portion 22 moves to the pressing plate acceleration starting position P2.

In the case where the reader CPU 301 discriminated that the movement of the front surface reading portion 22 to the pressing plate acceleration starting position P2 was completed (YES of surface S17), the reader CPU 301 puts the LEDs 22a and 22b in the off state (step S18), and then ends the process.

Further, in this embodiment, in the case where the front surface reading portion 22 is in the skimming-through reading position P1 or the pressing plate acceleration starting position P2 in a state in which the image reading is not carried out for a long time, after a lapse of a predetermined time, the front surface reading portion 22 is moved to the stand-by position HP. By doing so, even in the case where an image reading characteristic changed due to a change in environment such as a temperature, a shading correction value acquiring process is performed again, and therefore, the shading correction value can be renewed to a proper shading correction value.

Here, a period after execution of the resolution setting process (step S7) in which the reading resolution in the reading job is set on the basis of the information inputted through the operating portion 3 and before the information for starting the reading job is inputted through the operating portion 3 (YES of step S1) is referred to as a period before job start. In this period before job start, on the basis of the set reading resolution, the controller 4 reads the shading region Ar1 of the white reference member 25 by the front surface reading portion 22, and then starts the correction value setting process (step S8) for setting the shading correction value.

Further, it is assumed that the controller 4 sets, for example, 600 dpi (first resolution) as the reading resolution in a first resolution setting process. Then, it is assumed that in a first correction value setting process, the controller 4 reads the white reference member 25 by the front surface reading portion 22 on the basis of 600 dpi and then sets and stores a first correction value as a shading correction value. Further, it is assumed that after the controller 4 sets and stores the first correction value and before the reading job is started, the reading job setting is changed and the reading resolution is changed to 300 dpi (second resolution) different from 600 dpi, in a second resolution setting process. By this, it is assumed that in a second correction value setting process, the controller 4 reads the white reference member 25 by the front surface reading portion 22 on the basis of 300 dpi and sets a second value as the shading correction value. Further, it is assumed that after the controller 4 sets and stores the second correction value and before the reading job is started, the reading job setting is changed again and the reading resolution is changed from 300 dpi to 600 dpi, in a third resolution setting process. In this case, in a third correction value setting process, the controller 4 sets the stored first correction value at a shading correction value without reading the white reference member 25 by the front surface reading portion 22 on the basis of 600 dpi. That is, the shading correction value set once is stored for a reading resolution time or until the reading job is started. By this, a process time can be shortened without lowering accuracy of the shading correction value.

Next, a process procedure for setting the reading resolution after the reading job is started in the image reading apparatus 10 of this embodiment will be described by using a flowchart of FIG. 10. The process in this case is executed in the case where the system CPU 311 discriminated that the reading job is not before the start thereof in the step S1 (NO of step S1). Further, this process is carried out by executing the control program which was read from the system ROM 312 and which was developed in the system RAM 313, by the system CPU 311.

The system CPU 311 sets the reading resolution on the basis of the job kind (function) and the setting information for the inputted job (step S30). The reading resolution setting method is the same as the reading resolution setting method in the above-described step S7, and therefore, description thereof will be omitted. After setting the reading resolution, the system CPU 311 notifies the reader CPU 301 of the reader controller of the reading resolution and the color mode set for the reading job, through the command data bus 321. The reader CPU 301 executes the shading correction value acquiring process (step S31). The shading correction value acquiring process includes the processes of the flowcharts shown in FIGS. 8 and 9 described above, and therefore, description thereof will be omitted. After the shading correction value acquiring process is executed, the reader CPU 301 executes the image reading process (step S32) and then ends the process.

The controller 4 starts the reading job after the end of the correction value setting process (steps S7 and S30) and after the information for starting the reading job is inputted through the operating portion 3. That is, even after the information for starting the reading job is inputted through the operating portion 3, until the correction value shading process is ended, the reading job is not started. During the reading of the original, the optical motor 305 (FIG. 3) moves the front surface reading portion 22 in the sub-scan direction so that the front surface reading portion 22 is in the skimming-through reading position P1. The front surface reading portion 22 reads the image of the original fed by the ADF 30, in a state in which the front surface reading portion 22 is at rest in the skimming-through reading position P1.

As described above, in the image reading apparatus 10 of this embodiment, after the execution of the resolution setting process and before the start of the reading job, the correction value shading process for setting the shading correction value by reading the white reference member 25 by the front surface reading portion 22 on the basis of the set reading resolution is started. For this reason, it is possible to suppress that the shading correction value acquired before the start of the reading job cannot be used after the start of the reading surface due to a difference in reading resolution and then the shading correction value is acquired again. By this, a time in which the front surface reading portion 22 is returned to the stand-by position HP after the start of the reading job and then is moved to the skimming-through reading position P1 or the pressing plate acceleration starting position P2 can be omitted. Therefore, it is possible to shorten not only a time from a reading start instruction to output of a first sheet but also an image reading process time.

Further, according to the image reading apparatus 10 of this embodiment, the reading job is started after the end of the correction value shading process and after the information for starting the reading job is inputted by the operating portion 3. For this reason, the shading correction value is set and then the reading job is started, so that a proper reading process can be carried out.

Further, according to the image reading apparatus 10 of this embodiment, the shading correction value set once is stored for a predetermined tie or until the reading job is started. By this, in the case where it is predicted that when the reading resolution is the same, the shading correction value is also the same as in a short period before a start of a single reading job, it is possible to omit a tie for setting the correction value again. Therefore, the process time can be shortened without lowering accuracy of the shading correction value.

Further, according to the image reading apparatus 10 of this embodiment, the shading region Ar1 (white reference member 25) is disposed adjacent to the skimming-through reading position P1 and the original supporting platen glass 21 with respect to the sub-scan direction. For this reason, the front surface reading portion 22 positioned in the stand-by position HP can be disposed so as to pass through the shading region Ar1 during movement thereof to the skimming-through reading position P1 or the pressing plate acceleration starting position P2. For this reason, an acquiring process time of the shading correction value can be further shortened.

Other Embodiments

In the above-described embodiment, the case where only the front surface of the original is read was described, but the present invention is not limited thereto. In the case where both surfaces (sides) of the original are read, the reading resolution may also be set for each of the front surface reading portion 22 and the back surface reading portion 40. In this case, the back surface reading portion 40 is different in constitution from the front surface reading portion 22 in that the back surface reading portion 40 is immovable, but a shading procedure of the reading resolution of the back surface reading portion 40 is similar to the shading procedure of the reading resolution of the front surface reading portion 22, so that detailed description thereof will be omitted.

In this case, the controller 4 executes a first reading resolution setting process for setting a first resolution which is the reading resolution of the front surface of the original. Thereafter, before the information for starting the reading job is inputted through the operating portion 3, the controller 4 starts a first correction value shading process for setting the shading correction value of the front surface reading portion 22 by reading a first reference surface 25a by the front surface reading portion 22 on the basis of the set first resolution. Further, the controller 4 executes a second reading resolution setting process for setting a second resolution which is the reading resolution of the back surface of the original. Thereafter, before the information for starting the reading job is inputted through the operating portion 3, the controller 4 starts a second correction value shading process for setting the shading correction value of the back surface reading portion 40 by reading a second reference surface 25b by the back surface reading portion 40 on the basis of the set second resolution. The back surface reading portion 40 is capable of reading the second reference surface 25b when the original is not fed between itself and the second reference surface 25b. Further, the back surface reading portion 40 is capable of reading the original when the original is fed between itself and the second reading surface 25b.

In this case, after the execution of the resolution setting process and before the start of the reading job, the correction value setting process for setting the shading correction value by reading the white reference member 25 by the front surface reading portion 22 and the back surface reading portion 40 on the basis of the set reading resolution is started. For this reason, it is possible to suppress that the shading correction value acquired before the start of the reading job cannot be used after the start of the reading job due to the difference in reading resolution and the shading correction value is acquired again. By this, it is possible to shorten not only the time from the reading start instruction to the output of the first sheet but also the image reading process time.

Further, in this embodiment, as the information for determining the reading resolution, the job kind, the magnification, the transmit resolution and the color mode were used, but the information is not limited thereto, and other pieces of information may also be used. For example, the reading resolution may also be determined on the basis of paper (sheet) thickness of the original such as thin paper or thick paper, or of the kind of the original such as a photograph or a character. Further, the reading resolution may also be directly designated by the user through the operating portion.

Further, in this embodiment, the case where the operating portion 3 was used as the input portion was described but the input portion is not limited thereto. For example, the information may also be inputted from an external computer to the operating portion 3.

Further, in this embodiment, the case where the two reading portions consisting of the front surface reading portion 22 and the back surface reading portion 40 was described, but the present invention is not limited thereto. The present invention is also applicable to an image reading apparatus including only a single reading portion.

Further, in this embodiment, the case where the image reading apparatus 10 is connected to the apparatus main assembly 2 was described, but the present invention is not limited thereto. For example, the present invention is also applicable to an image reading apparatus, independent of the image forming apparatus, such as a flat-head scanner including the ADF 30. In that case, pieces of image information read by the front surface reading portion 22 and the back surface reading portion 40 are transmitted to the external computer through wire or wireless communication means, or are once stored in a storing device in the image reading apparatus and then are transmitted to a storing medium or the external computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-215854 filed on Nov. 28, 2019, which is hereby incorporated by reference herein in its entirety.

What is claimed is:

1. An image reading apparatus comprising:
   an original stacking portion configured to stack an original;
   an original feeding portion configured to feed the original stacked on said original stacking portion;
   an image reading portion configured to read, with a set reading resolution, an image of the original fed by said original feeding portion and configured to generate image data in accordance with the read image;
   a shading operation portion configured to cause said image reading portion to read a white reference member so as to acquire a shading correction value for subjecting the image data to shading correction; and
   a receiving portion configured to receive a resolution change instruction for changing setting of the reading resolution,
   wherein said shading operation portion acquires the shading correction value by causing said image reading portion to read said white reference member with a predetermined reading resolution when the original is stacked on said original stacking portion, and
   when the resolution change instruction is received before reading of the original is started, depending on the resolution change instruction, said shading operation portion acquires the shading correction value by causing again said image reading portion to read said white reference member with a changed reading resolution.

2. An image reading apparatus according to claim 1, further comprising a moving portion configured to move said image reading portion to a position opposing said white reference member so as to acquire the shading correction value.

3. An image reading apparatus according to claim 1, further comprising an operating portion configured to receive input of information from a user,
   wherein the reading resolution is changed depending on the input of the information through said operating portion.

4. An image reading apparatus according to claim 3, wherein an instruction to change the reading resolution is provided through said operating portion.

5. An image reading apparatus according to claim 3, wherein magnification of the image data is changeable through said operating portion, and the reading resolution is changed depending on a change in magnification.

6. An image reading apparatus according to claim 3, further comprising:
   an image forming portion configured to form an image on a sheet on the basis of the image data; and
   a transmitting portion configured to transmit the image data to an external device,
   wherein said operating portion is capable of changing a transmission resolution of the image data transmitted by said transmitting portion, and the reading resolution is changed depending on a change in transmission resolution.

7. An image reading apparatus according to claim 1, wherein the reading resolution includes a reading resolution with respect to a main scan direction and a reading resolution with respect to a sub-scan direction.

* * * * *